US012754016B2

(12) United States Patent
Shiga et al.

(10) Patent No.: US 12,754,016 B2
(45) Date of Patent: Oct. 6, 2026

(54) MANAGEMENT SYSTEM FOR WORK VEHICLE, MANAGEMENT METHOD FOR WORK VEHICLE, AND WORK VEHICLE

(71) Applicant: Komatsu Ltd., Tokyo (JP)

(72) Inventors: Tatsuya Shiga, Tokyo (JP); Daisuke Tanaka, Tokyo (JP)

(73) Assignee: KOMATSU LTD., Tokyo (JP)

( * ) Notice: Subject to any disclaimer, the term of this patent is extended or adjusted under 35 U.S.C. 154(b) by 114 days.

(21) Appl. No.: 18/713,749

(22) PCT Filed: Nov. 21, 2022

(86) PCT No.: PCT/JP2022/043011
§ 371 (c)(1),
(2) Date: May 28, 2024

(87) PCT Pub. No.: WO2023/100706
PCT Pub. Date: Jun. 8, 2023

(65) Prior Publication Data
US 2025/0020460 A1 Jan. 16, 2025

(30) Foreign Application Priority Data
Dec. 1, 2021 (JP) ................................ 2021-195686

(51) Int. Cl.
*G01C 9/02* (2006.01)

(52) U.S. Cl.
CPC .................................... *G01C 9/02* (2013.01)

(58) Field of Classification Search
CPC . G01C 9/02; G01C 21/165; B60P 1/00; B60P 3/00; E02F 9/205; E02F 9/267; G08G 1/00; G08G 1/13
See application file for complete search history.

(56) References Cited

U.S. PATENT DOCUMENTS

2019/0340848 A1* 11/2019 Nakamura ............. G07C 5/008
2020/0072150 A1* 3/2020 Fujiwara ............... F02B 77/085
2021/0001847 A1 1/2021 Baba et al.

FOREIGN PATENT DOCUMENTS

JP 2004-325777 A 11/2004
JP 2020-021281 A 2/2020
JP 2020-103104 A 7/2020

OTHER PUBLICATIONS

English translation of Abe (JP 2004325777) (Year: 2004).*

* cited by examiner

*Primary Examiner* — Kyle J Kingsland
(74) *Attorney, Agent, or Firm* — Troutman Pepper Locke LLP

(57) ABSTRACT

A management system for a work vehicle includes: a standard value calculation unit that calculates a standard value related to a detection value based on the detection value of a first attitude angle sensor when a work vehicle including the first attitude angle sensor stops at a predetermined position of a work site; and a diagnosis unit that determines presence or absence of abnormality of a second attitude angle sensor based on the standard value calculated by the standard value calculation unit and a detection value of the second attitude angle sensor when a work vehicle including the second attitude angle sensor stops at the predetermined position.

17 Claims, 12 Drawing Sheets

MANAGEMENT SYSTEM FOR WORK VEHICLE, MANAGEMENT METHOD FOR WORK VEHICLE, AND WORK VEHICLE

FIELD

The present disclosure relates to a management system for a work vehicle, a management method for a work vehicle, and a work vehicle.

BACKGROUND

In a technical field related to work vehicles, an unmanned vehicle including an inclination sensor as disclosed in Patent Literature 1 is known.

CITATION LIST

Patent Literature

Patent Literature 1: JP 2020-021281 A

SUMMARY

Technical Problem

When a work vehicle travels based on a detection value of the inclination sensor, when an abnormality occurs in the inclination sensor, the abnormality of the inclination sensor may affect the travel of the work vehicle.

An object of the present disclosure is to monitor the presence or absence of abnormality of an inclination sensor.

Solution to Problem

According to an aspect of the present invention, a management system for a work vehicle, comprises: a standard value calculation unit that calculates a standard value related to a detection value based on the detection value of a first attitude angle sensor when a work vehicle including the first attitude angle sensor stops at a predetermined position of a work site; and a diagnosis unit that determines presence or absence of abnormality of a second attitude angle sensor based on the standard value calculated by the standard value calculation unit and a detection value of the second attitude angle sensor when a work vehicle including the second attitude angle sensor stops at the predetermined position.

Advantageous Effects of Invention

According to the present disclosure, it is possible to monitor the presence or absence of abnormality of an inclination sensor.

DESCRIPTION OF EMBODIMENTS

Hereinafter, an embodiment according to the present disclosure will be described with reference to the drawings, but the present disclosure is not limited to the embodiment. Components of the embodiment described below can be appropriately combined. In addition, some components may not be used.

[Work Site]

Figure 1:
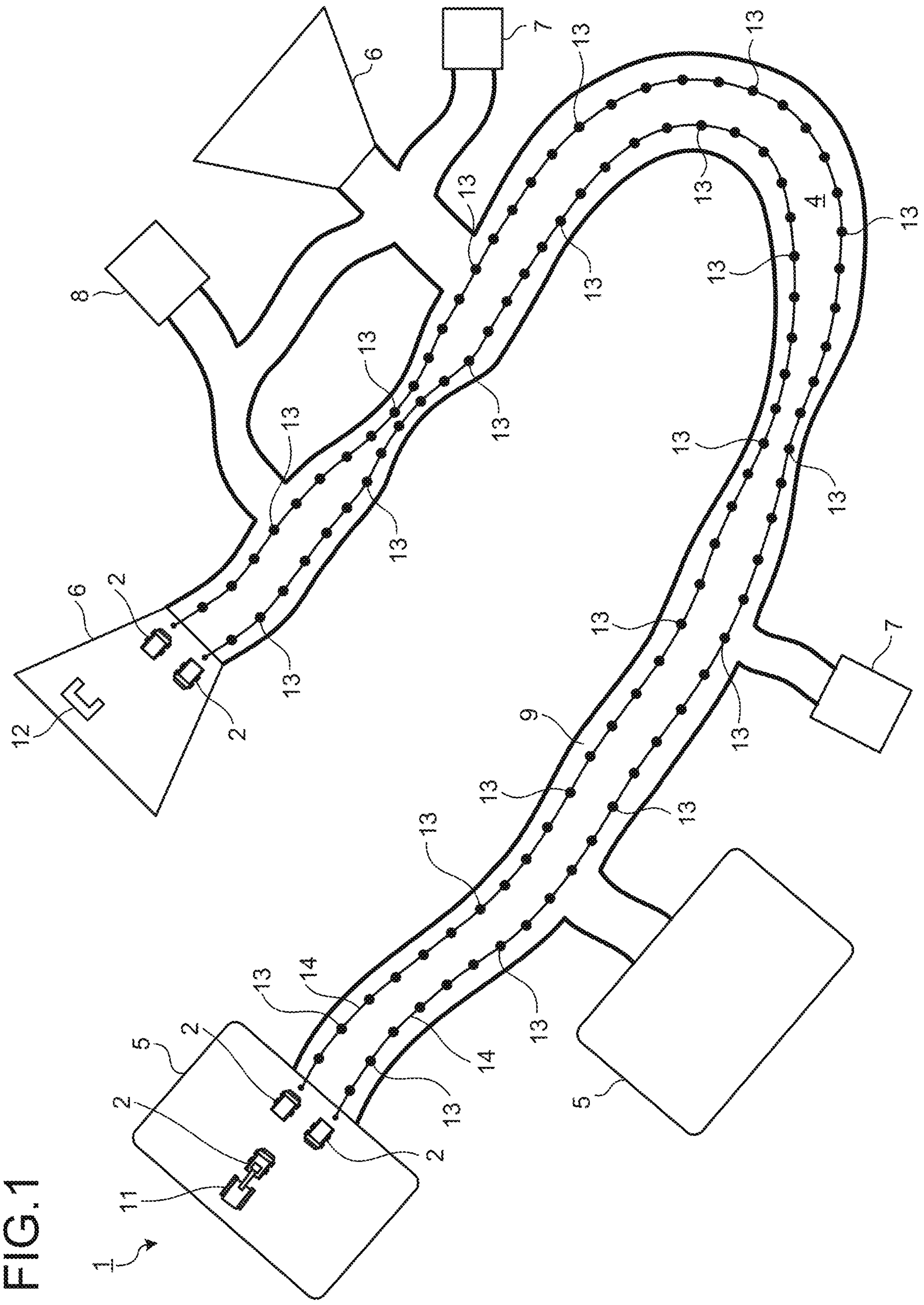
FIG. 1 is a diagram schematically illustrating a work site of a work vehicle according to an embodiment.

FIG. 1 is a diagram schematically illustrating a work site 1 of a work vehicle 2 according to an embodiment.

In the embodiment, the work site 1 is a mine. The mine refers to a place or premises where minerals are mined. Examples of the mine include a metal mine where metal is mined, a non-metal mine where limestone is mined, and a coal mine where coal is mined. Note that the work site 1 may be a quarry. The quarry refers to a place or premises where stones are mined.

At the work site 1, a plurality of work vehicles 2 operates. Examples of the work vehicle 2 include a haul vehicle that travels at the work site 1 and hauls a load. Examples of the load to be hauled by the work vehicle 2 include an excavated object excavated at the work site 1.

In the embodiment, the work vehicle 2 is an unmanned vehicle that operates in an unmanned manner without depending on a driving manipulation by a driver. In the embodiment, the work vehicle 2 is an unmanned dump truck that travels at the work site 1 in an unmanned manner and hauls a load.

A travel area 4 is set at the work site 1. The travel area 4 refers to an area where the work vehicle 2 can travel. The travel area 4 includes a loading area 5, a discharging area 6, a parking area 7, a fuel supply area 8, and a traveling path 9.

The loading area 5 refers to an area in which a loading work of loading a load on the work vehicle 2 is performed. In the loading area 5, a loader 11 operates. Examples of the loader 11 include an excavator.

The discharging area 6 refers to an area where a discharging work of discharging a load from the work vehicle 2 is performed. A crusher 12 is disposed in the discharging area 6.

The parking area 7 refers to an area where the work vehicle 2 is parked.

The fuel supply area 8 refers to an area where the work vehicle 2 is supplied with fuel.

The traveling path 9 refers to an area where the work vehicle 2 travels toward at least one of the loading area 5, the discharging area 6, the parking area 7, the fuel supply area 8. The traveling path 9 is connected to each of the loading area 5, the discharging area 6, the parking area 7, and the fuel supply area 8. The work vehicle 2 travels on the traveling path 9 back and forth between the loading area 5 and the discharging area 6.

[Management System]

Figure 2:
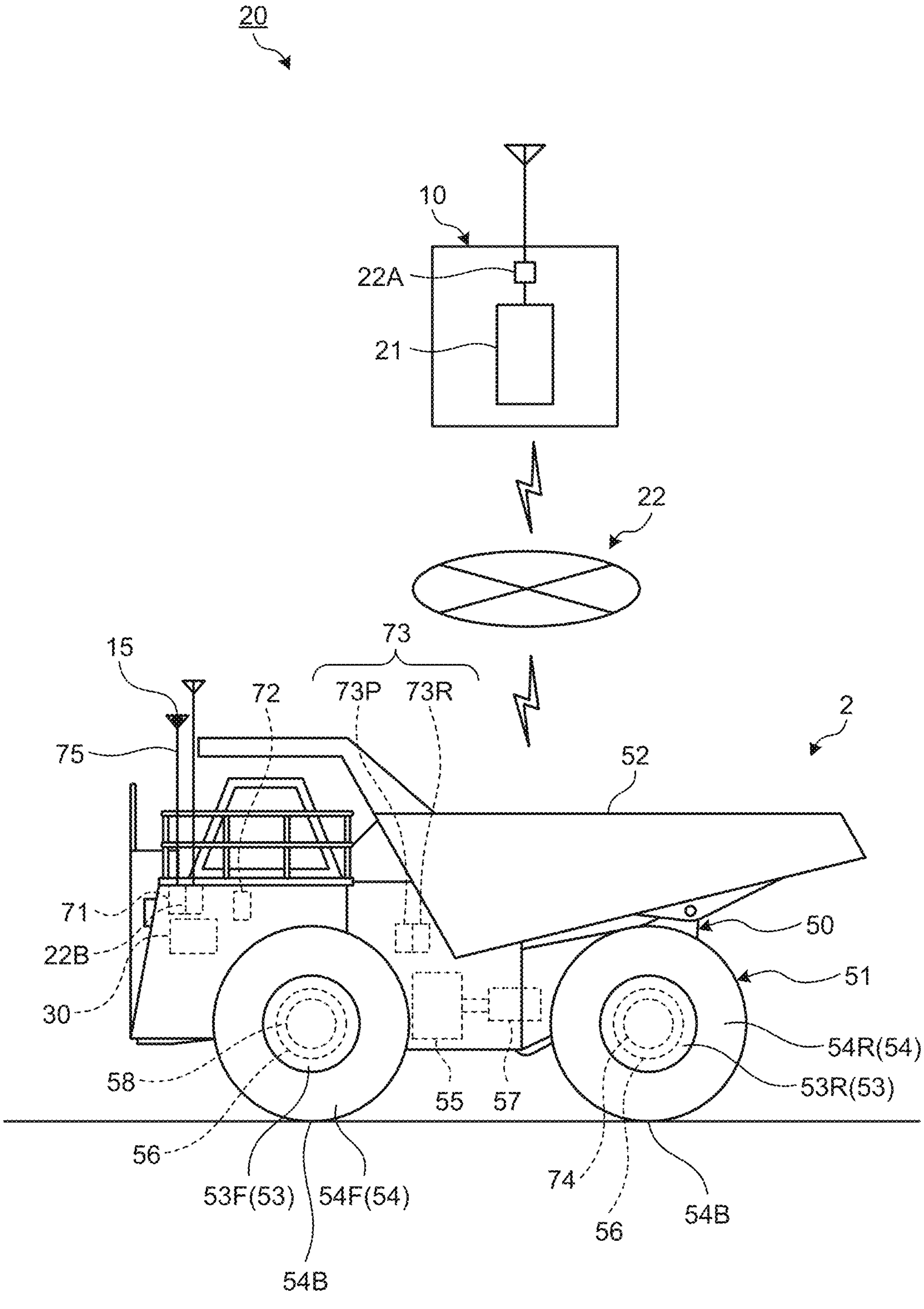
FIG. 2 is a diagram schematically illustrating a management system for a work vehicle according to an embodiment.

FIG. 2 is a diagram schematically illustrating a management system 20 for the work vehicle 2 according to the embodiment.

The management system 20 manages at least an operation state of the work vehicle 2. The management system 20 includes a management device 21 and a communication system 22. The management device 21 is disposed outside the work vehicle 2. The management device 21 is installed in a control facility 10 of the work site 1. The management device 21 includes a computer system. Examples of the communication system 22 include the Internet, a mobile phone communication network, a satellite communication network, and a local area network (LAN).

The work vehicle 2 includes a control device 30. The control device 30 includes a computer system. The management device 21 and the control device 30 of the work vehicle 2 wirelessly communicate with each other via the communication system 22. A wireless communicator 22A is connected to the management device 21. A wireless communicator 22B is connected to the control device 30. The communication system 22 includes the wireless communicator 22A and the wireless communicator 22B.

In the embodiment, the management device 21 generates travel data indicating travel conditions of the work vehicle 2. The travel conditions of the work vehicle 2 include a target position of the work vehicle 2, a target travel speed of the work vehicle 2, and a target orientation of the work vehicle 2. The travel data generated by the management device 21 is transmitted to the work vehicle 2 via the communication system 22. The work vehicle 2 travels in the travel area 4 based on the travel data transmitted from the management device 21.

As illustrated in FIG. 1, the travel data is defined by a travel point 13 and a travel path 14. A plurality of travel points 13 is set in the travel area 4. The plurality of travel points 13 is set at intervals. The travel points 13 define the target position of the work vehicle 2. The target position of the work vehicle 2 refers to a target position of the work vehicle 2 when passing through the travel point 13. The target travel speed of the work vehicle 2 and the target orientation of the work vehicle 2 are set at each of the plurality of travel points 13. The target travel speed of the work vehicle 2 refers to a target travel speed of the work vehicle 2 when passing through the travel point 13. The target orientation of the work vehicle 2 refers to a target orientation of the work vehicle 2 when passing through the travel point 13. The travel path 14 defines a target travel route of the work vehicle 2. The travel path 14 is defined by an imaginary line passing through the plurality of travel points 13.

[Work Vehicle]

Figure 3:
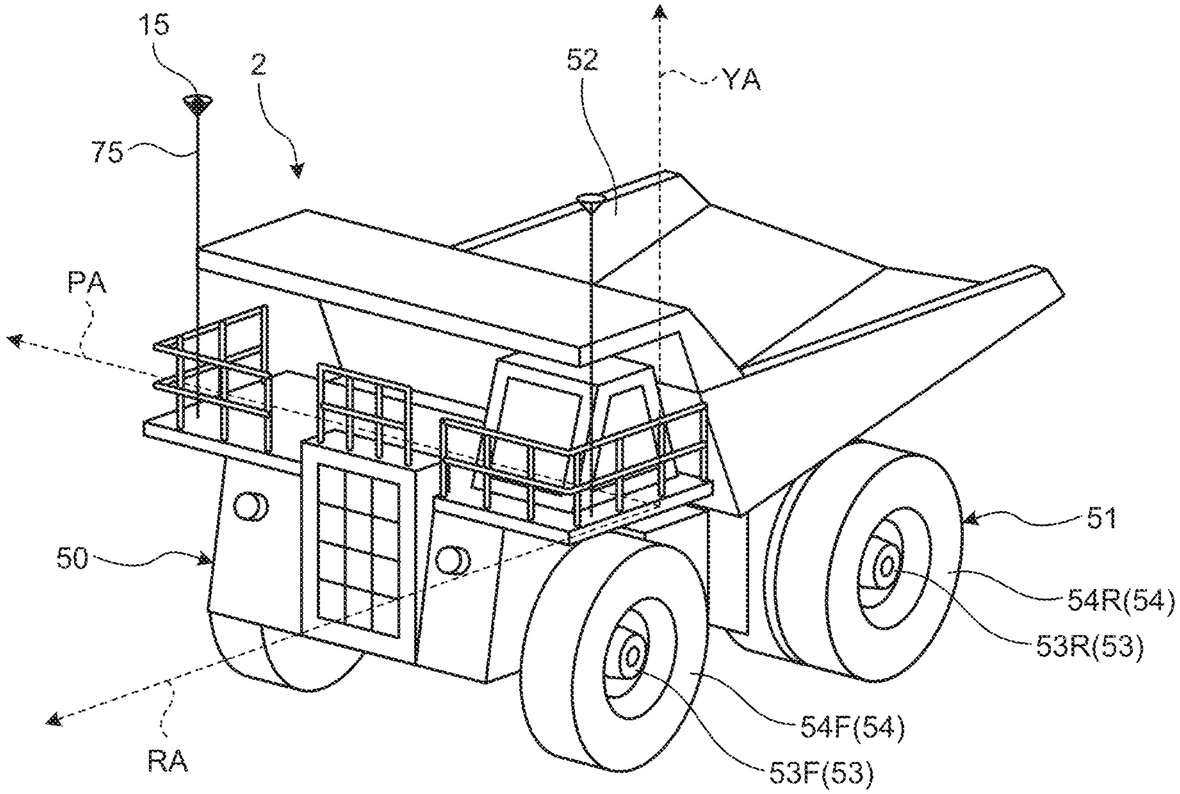
FIG. 3 is a perspective diagram schematically illustrating a work vehicle according to an embodiment.
Figure 4:
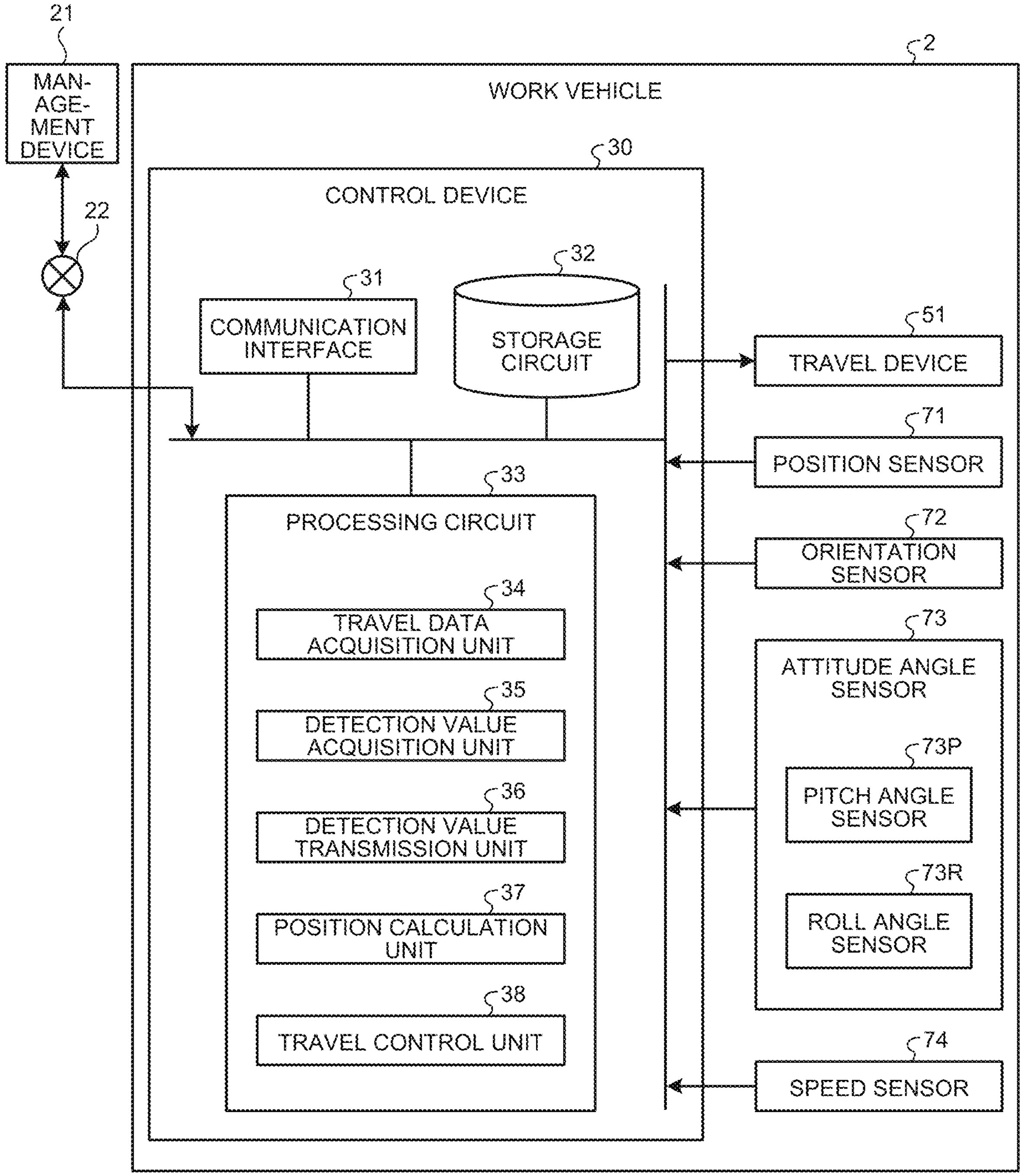
FIG. 4 is a block diagram illustrating a work vehicle according to an embodiment.

FIG. 3 is a perspective diagram schematically illustrating the work vehicle 2 according to the embodiment. FIG. 4 is a block diagram illustrating the work vehicle 2 according to the embodiment.

As illustrated in FIGS. 2, 3, and 4, the work vehicle 2 includes the wireless communicator 22B, the control device 30, a vehicle body 50, a travel device 51, a dump body 52, a position sensor 71, an orientation sensor 72, an attitude angle sensor 73, and a speed sensor 74.

As illustrated in FIG. 3, a local coordinate system is defined in the work vehicle 2. The local coordinate system is defined by a pitch axis PA, a roll axis RA, and a yaw axis YA. The pitch axis PA extends in a left-right direction (vehicle width direction) of the work vehicle 2. The roll axis RA extends in a front-rear direction of the work vehicle 2. The yaw axis YA extends in an up-down direction of the work vehicle 2. The pitch axis PA and the roll axis RA are orthogonal to each other. The roll axis RA and the yaw axis YA are orthogonal to each other. The yaw axis YA and the pitch axis PA are orthogonal to each other.

The vehicle body 50 includes a vehicle body frame. The vehicle body 50 is supported by the travel device 51. The vehicle body 50 supports the dump body 52.

The travel device 51 causes the work vehicle 2 to travel. The travel device 51 causes the work vehicle 2 to move forward or backward. At least a part of the travel device 51 is disposed below the vehicle body 50. The travel device 51 includes wheels 53, tires 54, a drive device 55, a brake device 56, a transmission device 57, and a steering device 58.

The wheel 53 is rotatably supported by at least a part of the vehicle body 50. The tires 54 are mounted on the wheels 53. The wheels 53 rotate in a state where the tires 54 are in contact with the road surface of the work site, and the work vehicle 2 travels at the work site 1. The wheels 53 include front wheels 53F and rear wheels 53R. The tires 54 include front tires 54F mounted on the front wheels 53F and rear tires 54R mounted on the rear wheels 53R.

The drive device 55 generates a driving force for starting or accelerating the work vehicle 2. Examples of the drive device 55 include an internal combustion engine and an electric motor. Examples of the internal combustion engine include a diesel engine.

The brake device 56 generates a braking force for decelerating or stopping the work vehicle 2. Examples of the brake device 56 include a disc brake and a drum brake.

The transmission device 57 transmits the driving force generated by the drive device 55 to the wheels 53. The transmission device 57 includes a forward clutch and a reverse clutch. When the coupling state between the forward clutch and the reverse clutch is switched, the forward movement and the backward movement of the work vehicle 2 are switched.

The steering device 58 generates a steering force for adjusting the traveling direction of the work vehicle 2. The traveling direction of the work vehicle 2 moving forward refers to the orientation of a front portion of the vehicle body 50. The traveling direction of the work vehicle 2 moving backward refers to the orientation of a rear portion of the vehicle body 50. The wheels 53 are steered by the steering device 58. The traveling direction of the work vehicle 2 is adjusted by steering of the wheels 53.

The dump body 52 is a member on which a load is loaded. At least a part of the dump body 52 is disposed above the vehicle body 50. The dump body 52 performs a dumping operation and a lowering operation. The dump body 52 is adjusted to a dumping posture and a loading posture by the dumping operation and the lowering operation. The dumping operation refers to an operation of raising the dump body 52 from the vehicle body 50 such that the dump body 52 is inclined in the dumping direction. In the embodiment, the dumping direction is the rear side of the vehicle body 50. The dumping posture refers to a posture in which the dump body 52 is raised. The lowering operation refers to an operation of lowering the dump body 52 such that the dump body 52 approaches the vehicle body 50. The loading posture refers to a posture in which the dump body 52 is lowered. When the discharging work is performed, the dump body 52 performs the dumping operation so as to change from the loading posture to the dumping posture. By the dumping operation of the dump body 52, the load loaded on the dump body 52 is discharged from the dump body 52 in the dumping direction. When the loading work is performed, the dump body 52 is adjusted to the loading posture.

The position sensor 71 detects the position of the work vehicle 2. The position of the work vehicle 2 is detected using a global navigation satellite system (GNSS). The position sensor 71 includes a GNSS receiver and detects the position of the work vehicle 2 in a global coordinate system. A GNSS antenna 75 is installed in the front portion of the vehicle body 50. In the embodiment, the position sensor 71 detects the position of a distal end portion 15 of the GNSS antenna 75.

The orientation sensor 72 detects the orientation of the work vehicle 2. The orientation of the work vehicle 2 includes a yaw angle Yθ of the work vehicle 2. The yaw angle Yθ refers to an inclination angle of the work vehicle 2 about the yaw axis YA. Examples of the orientation sensor 72 include a gyro sensor.

The attitude angle sensor 73 detects an attitude angle of the work vehicle 2. The attitude angle of the work vehicle 2 includes an inclination angle of the vehicle body 50. The inclination angle of the vehicle body 50 includes a pitch angle Pθ and a roll angle Rθ of the vehicle body 50. The pitch angle Pθ refers to an inclination angle of the vehicle body 50 about the pitch axis PA. The roll angle Rθ refers to an inclination angle of the vehicle body 50 about the roll axis RA. Examples of the attitude angle sensor 73 include a slope sensor. In the embodiment, the attitude angle sensor 73 includes a pitch angle sensor 73P that detects the pitch angle Pθ and a roll angle sensor 73R that detects the roll angle Rθ.

In a state where a lower end portion 54B of the tire 54 is in contact with the ground parallel to a horizontal plane, each of the pitch axis PA and the roll axis RA is parallel to the horizontal plane. In a state where the lower end portion 54B of the tire 54 is in contact with the ground parallel to the horizontal plane, each of the pitch angle Pθ and the roll angle Rθ is 0[°]. The lower end portion 54B of the tire 54 refers to a part of an outer peripheral surface of the tire 54 disposed at the lowermost side in the up-down direction parallel to the yaw axis YA.

The speed sensor 74 detects a travel speed of the work vehicle 2. Examples of the speed sensor 74 include a pulse sensor that detects the rotation of the wheels 53.

The control device 30 is disposed in the vehicle body 50. The control device 30 outputs a control command that controls the travel device 51. The control command output from the control device 30 includes a drive command for actuating the drive device 55, a braking command for actuating the brake device 56, a forward-backward command for actuating the transmission device 57, and a steering command for actuating the steering device 58. The drive device 55 generates a driving force for starting or accelerating the work vehicle 2 based on the drive command output from the control device 30. The brake device 56 generates a braking force for stopping or decelerating the work vehicle 2 based on the braking command output from the control device 30. The transmission device 57 switches between forward movement and backward movement of the work vehicle 2 based on the forward-backward command output from the control device 30. The steering device 58 generates a steering force for causing the work vehicle 2 to move straight or swing based on the steering command output from the control device 30.

As illustrated in FIG. 4, the control device 30 includes a communication interface 31, a storage circuit 32, and a processing circuit 33.

The communication interface 31 is connected to the processing circuit 33. The communication interface 31 controls communication between the control device 30 and the management device 21. The communication interface 31 communicates with the management device 21 via the communication system 22.

The storage circuit 32 is connected to the processing circuit 33. The storage circuit 32 stores data. Examples of the storage circuit 32 include nonvolatile memory or volatile memory. Examples of the nonvolatile memory include read only memory (ROM) and a storage. Examples of the storage include a hard disk drive (HDD) and a solid state drive (SSD). Examples of the volatile memory include random access memory (RAM).

The processing circuit 33 performs arithmetic processing and control command output processing. Examples of the processing circuit 33 include a processor. Examples of the processor include a central processing unit (CPU) and a micro processing unit (MPU). A computer program is stored in the storage circuit 32. The processing circuit 33 exerts a predetermined function by acquiring and executing the computer program from the storage circuit 32.

The processing circuit 33 includes a travel data acquisition unit 34, a detection value acquisition unit 35, a detection value transmission unit 36, a position calculation unit 37, and a travel control unit 38.

The travel data acquisition unit 34 acquires the travel data transmitted from the management device 21 via the communication interface 31. When the management device 21 updates the travel data, the travel data acquisition unit 34 acquires the updated travel data. The travel data acquisition unit 34 acquires travel data each time the travel data is updated.

The detection value acquisition unit 35 acquires each of the detection value of the position sensor 71, the detection value of the orientation sensor 72, the detection value of the attitude angle sensor 73, and the detection value of the speed sensor 74.

The detection value transmission unit 36 transmits at least the detection value of the attitude angle sensor 73 to the management device 21 via the communication interface 31.

The position calculation unit 37 calculates the position of a specific portion 16 of the work vehicle 2 based on the detection value of the position sensor 71 and the detection value of the attitude angle sensor 73.

Figure 5:
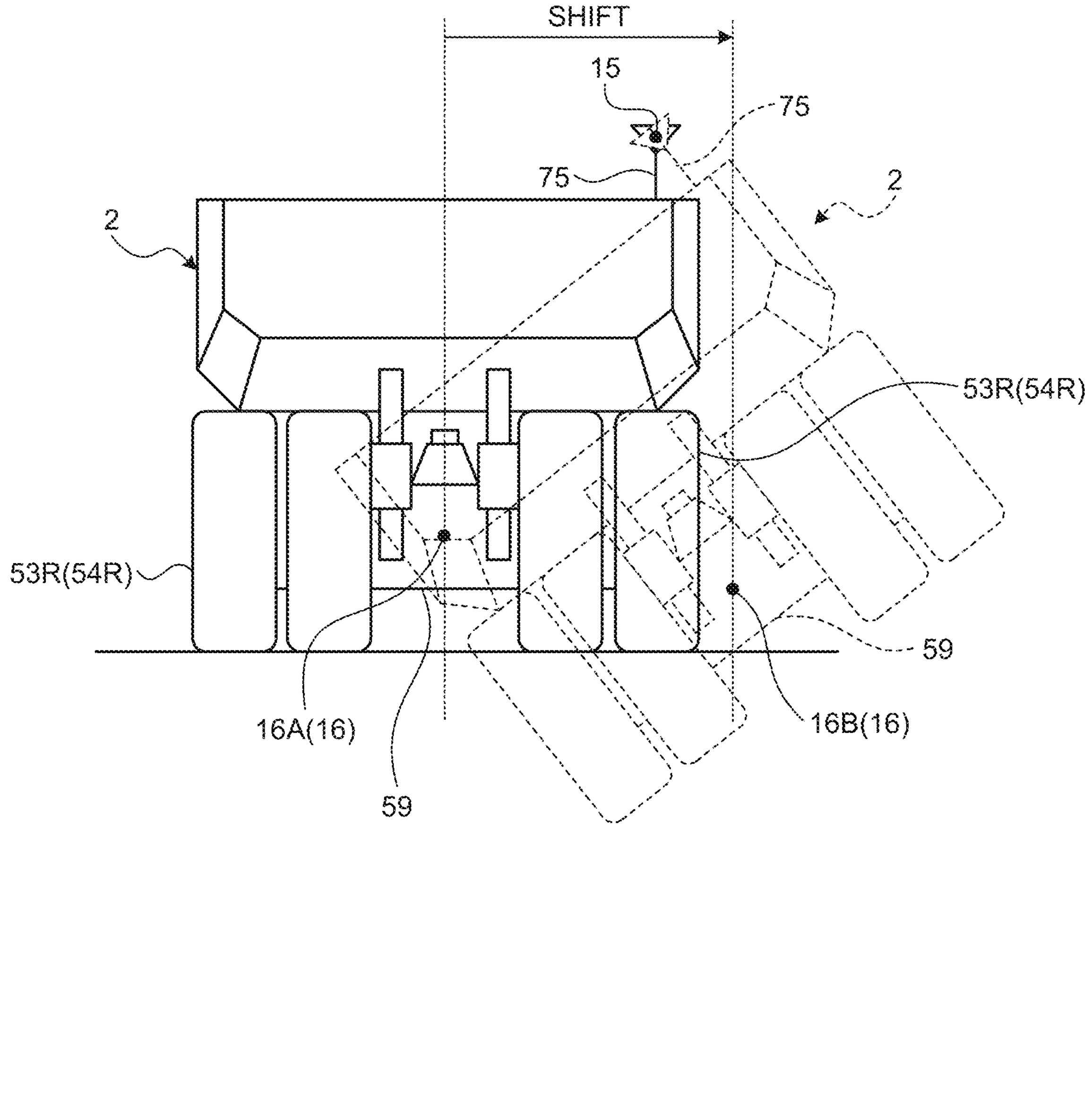
FIG. 5 is a diagram for describing a method of calculating a position of a specific portion by a position calculation unit according to an embodiment.

FIG. 5 is a diagram for describing a method of calculating the position of the specific portion 16 by the position calculation unit 37 according to the embodiment. FIG. 5 is a diagram of the work vehicle 2 viewed from the rear side.

As illustrated in FIG. 5, the work vehicle 2 has an axle 59 that supports rear wheels 53R. In the embodiment, the specific portion 16 of the work vehicle 2 is a central portion of the axle 59 in the vehicle width direction. As described above, the position sensor 71 detects the position of the distal end portion 15 of the GNSS antenna 75. The distal end portion 15 and the specific portion 16 are away from each other. The relative position between the distal end portion 15 and the specific portion 16 is known data. The relative position between the distal end portion 15 and the specific portion 16 can be derived from, for example, design data or specification data of the work vehicle 2. The relative position between the distal end portion 15 and the specific portion 16 is stored in the storage circuit 32.

As indicated by the solid lines in FIG. 5, when the work vehicle 2 is disposed on the ground parallel to the horizontal plane, the position calculation unit 37 can calculate a position 16A of the specific portion 16 in the global coordinate system based on the position of the distal end portion 15 detected by the position sensor 71 and the relative position between the distal end portion 15 and the specific portion 16.

As indicated by the dotted lines in FIG. 5, when the work vehicle 2 is inclined about the roll axis RA, the specific portion 16 is shifted in a direction parallel to the pitch axis PA and disposed at a position 16B different from the position 16A. When the fact that the position of the specific portion 16 is shifted when the work vehicle 2 is inclined about the roll axis RA is not taken into consideration, an error occurs between the position of the specific portion 16 calculated by the position calculation unit 37 and the true position of the specific portion 16. In order to calculate the true position of the specific portion 16 when the work vehicle 2 is inclined about the roll axis RA, the position calculation unit 37 corrects the position 16A of the specific portion 16 based on the detection value of the roll angle sensor 73R and calculates the position 16B. As a result, an error between the position 16B of the specific portion 16 calculated by the position calculation unit 37 and the true position of the specific portion 16 is reduced.

The method of calculating the position of the specific portion 16 when the work vehicle 2 is inclined about the roll axis RA has been described above with reference to FIG. 5. Next, a method of calculating the position of the specific portion 16 when the work vehicle 2 is inclined about the pitch axis PA will be described above with reference to FIG. 6.

Figure 6:
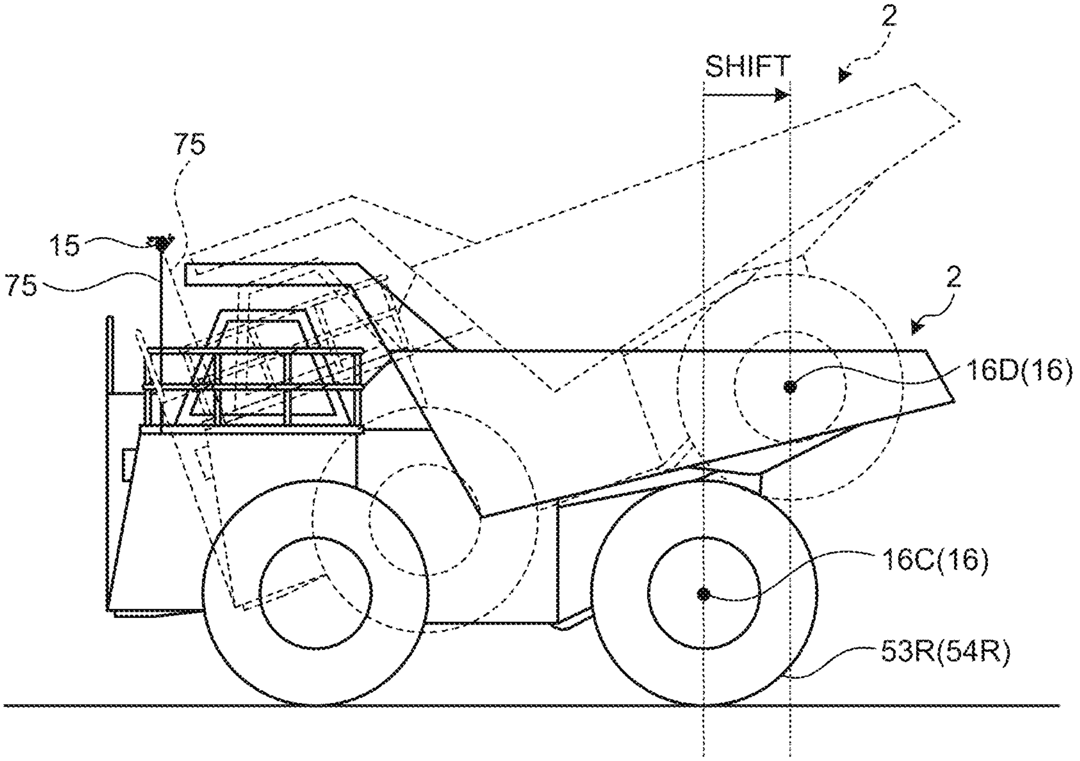
FIG. 6 is a diagram for describing a method of calculating a position of a specific portion by a position calculation unit according to an embodiment.

FIG. 6 is a diagram for describing a method of calculating the position of the specific portion 16 by the position calculation unit 37 according to the embodiment. FIG. 6 is a diagram of the work vehicle 2 viewed from the left side.

As indicated by the solid lines in FIG. 6, when the work vehicle 2 is disposed on the ground parallel to the horizontal plane, the position calculation unit 37 can calculate a position 16C of the specific portion 16 in the global coordinate system based on the position of the distal end portion 15 detected by the position sensor 71 and the relative position between the distal end portion 15 and the specific portion 16.

As indicated by the dotted lines in FIG. 6, when the work vehicle 2 is inclined about the pitch axis PA, the specific portion 16 is shifted in a direction parallel to the roll axis RA and disposed at a position 16D different from the position 16C. When the fact that the position of the specific portion 16 is shifted when the work vehicle 2 is inclined about the pitch axis PA is not taken into consideration, an error occurs between the position of the specific portion 16 calculated by the position calculation unit 37 and the true position of the specific portion 16. In order to calculate the true position of the specific portion 16 when the work vehicle 2 is inclined about the pitch axis PA, the position calculation unit 37 corrects the position 16C of the specific portion 16 based on the detection value of the pitch angle sensor 73P and calculates the position 16D. As a result, an error between the position 16D of the specific portion 16 calculated by the position calculation unit 37 and the true position of the specific portion 16 is reduced.

Returning to FIG. 4, the travel control unit 38 controls the travel device 51 based on the travel data acquired by the travel data acquisition unit 34.

As described above, the travel data is defined by the travel point 13 and the travel path 14. The travel control unit 38 controls the travel device 51 so that the work vehicle 2 travels along the travel path 14.

Figure 7:
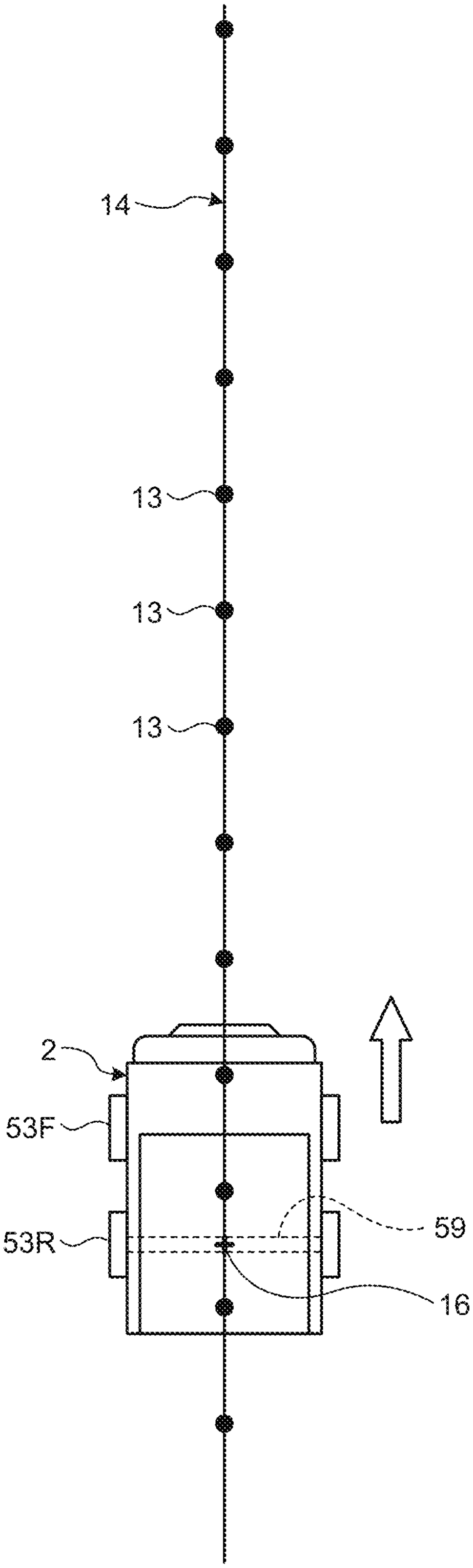
FIG. 7 is a diagram for describing a relationship between a work vehicle and a travel path according to an embodiment.

FIG. 7 is a diagram for describing a relationship between the work vehicle 2 and the travel path 14 according to the embodiment.

The work vehicle 2 travels in the travel area 4 along the travel path 14. The work vehicle 2 travels in the travel area 4 such that the specific portion 16 of the work vehicle 2 moves along the travel path 14. As described above, the specific portion 16 of the work vehicle 2 is a central portion of the axle 59 in the vehicle width direction.

The travel control unit 38 controls the travel device 51 so that the work vehicle 2 travels in a state where the specific portion 16 and the travel path 14 coincide with each other.

The travel control unit 38 controls the travel device 51 based on the detection data of the position sensor 71, the detection data of the orientation sensor 72, the detection data of the attitude angle sensor 73, and the detection data of the speed sensor 74.

The travel control unit 38 controls the travel device 51 so as to reduce a deviation between the position of the specific portion 16 of the work vehicle 2 calculated by the position calculation unit 37 and the target position of the work vehicle 2 set at the travel point 13 when the specific portion 16 passes through the travel point 13.

The travel control unit 38 controls the travel device 51 so as to reduce a deviation between the detection orientation of the work vehicle 2 detected by the orientation sensor 72 and the target orientation of the work vehicle 2 set at the travel point 13 when the specific portion 16 passes through the travel point 13.

The travel control unit 38 controls the travel device 51 so as to reduce a deviation between the detection travel speed of the work vehicle 2 detected by the speed sensor 74 and the target travel speed of the work vehicle 2 set at the travel point 13 when the specific portion 16 passes through the travel point 13.

[Method of Diagnosing Attitude Angle Sensor]

As described above, the detection value of the position sensor 71 is corrected based on the detection value of the attitude angle sensor 73. When an abnormality of the attitude angle sensor 73 occurs, the detection value of the position sensor 71 is not appropriately corrected, and there is a possibility that an error occurs between the position of the specific portion 16 calculated by the position calculation unit 37 and the true position of the specific portion 16. When an error occurs in the position of the specific portion 16, it is difficult for the work vehicle 2 to travel according to the travel data. When an error occurs in the position of the specific portion 16, the work vehicle 2 may deviate from the travel path 14, for example.

In the embodiment, the management device 21 monitors the state of the attitude angle sensor 73 and diagnoses the state of the attitude angle sensor 73. The management device 21 determines the presence or absence of an abnormality of the attitude angle sensor 73.

At the work site 1, a plurality of work vehicles 2 operates. At the work site 1, there is a predetermined position 17 where the work vehicle 2 repeatedly stops. In order to diagnose the state of the attitude angle sensor 73, the management device 21 acquires the detection value of the attitude angle sensor 73 of the work vehicle 2 each time the work vehicle 2 stops at the predetermined position 17. That is, the management device 21 collects a plurality of detection values of the attitude angle sensor 73 of the work vehicle 2 stopped at the predetermined position 17.

Figure 8:
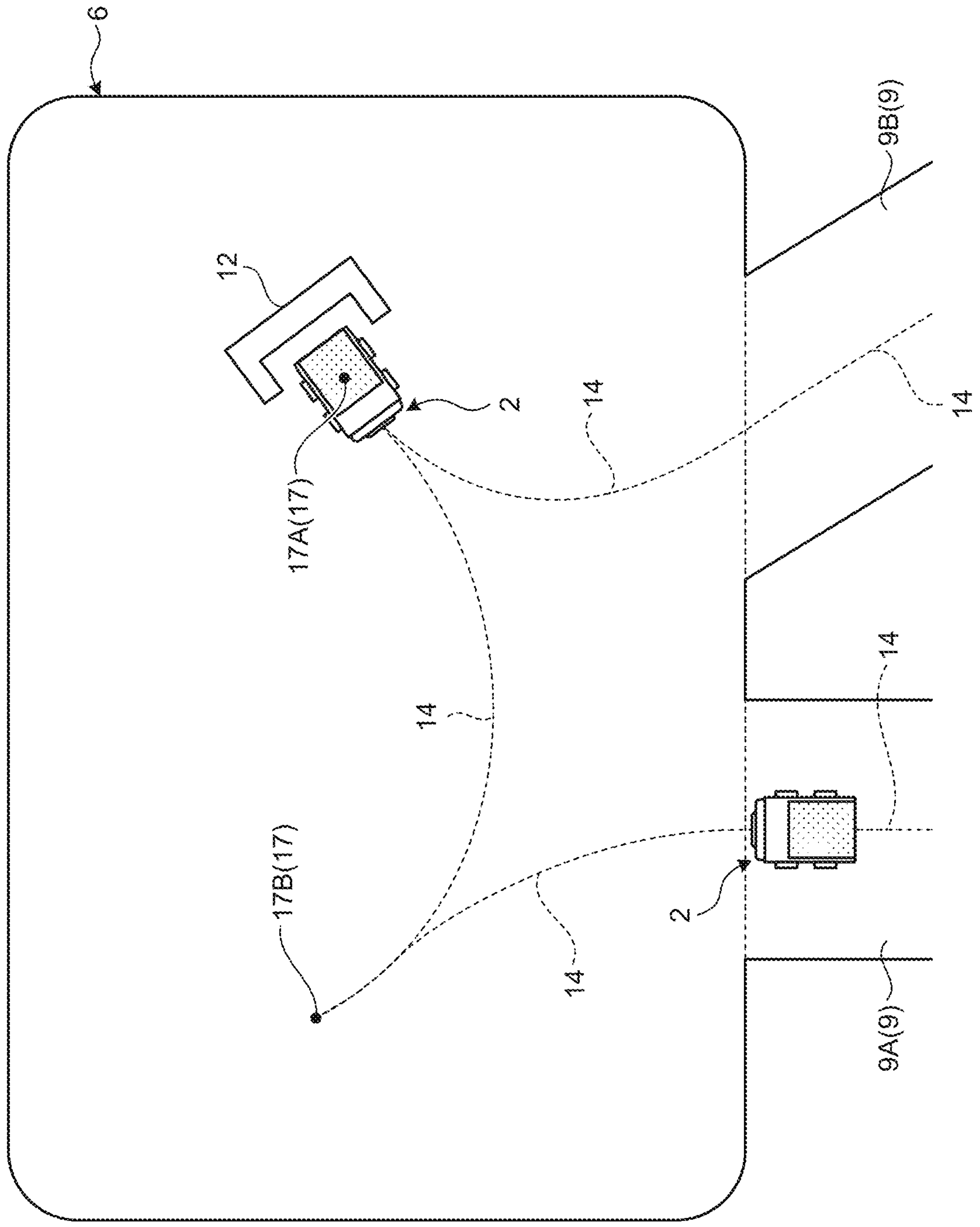
FIG. 8 is a diagram for describing a predetermined position according to an embodiment.

FIG. 8 is a diagram for describing the predetermined position 17 according to the embodiment. As illustrated in FIG. 8, the predetermined position 17 exists in the discharging area 6. In the example illustrated in FIG. 8, the traveling path 9 includes an approach path 9A on which the work vehicle 2 entering the discharging area 6 travels and an exit path 9B on which the work vehicle 2 leaving the discharging area 6 travels. Each of the approach path 9A and the exit path 9B is connected to the discharging area 6. The travel path 14 is set in each of the approach path 9A, the discharging area 6, and the exit path 9B.

The plurality of work vehicles 2 that performs the discharging work sequentially enters the discharging area 6. At a crusher 12 in the discharging area 6, the plurality of work vehicles 2 sequentially performs the discharging work. The plurality of work vehicles 2 that has performed the discharging work sequentially leaves the discharging area 6.

A discharge position 17A and a switchback position 17B are set in the discharging area 6. Each of the discharge position 17A and the switchback position 17B is set by the management device 21. The travel path 14 is defined to include each of the discharge position 17A and the switchback position 17B. Note that each of the discharge position 17A and the switchback position 17B may be regarded as a kind of the travel point 13.

The discharge position 17A refers to a position where a load is discharged from the work vehicle 2 to the crusher 12. The work vehicle 2 that performs the discharging work with respect to the crusher 12 is disposed at the discharge position 17A.

The switchback position 17B refers to a position where the work vehicle 2 performs switchback. The switchback refers to an operation in which the work vehicle 2 moving forward changes its traveling direction and approaches the discharge position 17A by moving backward.

The work vehicle 2 that has entered the discharging area 6 from the approach path 9A moves to the switchback position 17B by moving forward along the travel path 14. The work vehicle 2 stops at the switchback position 17B to stand by for the discharging work. For example, when a preceding work vehicle 2 is disposed at the discharge position 17A and is performing the discharging work, a next work vehicle 2 waits at the switchback position 17B. After it becomes possible to perform the discharging work, the work vehicle 2 performs the switchback at the switchback position 17B and moves to the discharge position 17A by moving backward.

The work vehicle 2 moved to the discharge position 17A stops at the discharge position 17A. The work vehicle 2 causes the dump body 52 to perform the dumping operation in a stopped state. As a result, the load is discharged from the dump body 52 to the crusher 12. The work vehicle 2 after performing the discharging work at the discharge position 17A leaves the discharging area 6 for the exit path 9B by moving forward along the travel path 14.

In the embodiment, the predetermined position 17 is the discharge position 17A. The discharge position 17A at which the load is discharged from the work vehicle 2 to the crusher 12 does not change. The plurality of work vehicles 2 sequentially stops at the discharge position 17A.

Note that the predetermined position 17 may be the switchback position 17B. The switchback position 17B defined in association with the discharge position 17A does not change. The plurality of work vehicles 2 sequentially stops at the switchback position 17B.

Note that the predetermined position 17 is not limited to the discharge position 17A or the switchback position 17B. For example, the plurality of work vehicles 2 sequentially stops at the fuel supply position of the fuel supply area 8. The predetermined position 17 may be a fuel supply position. In addition, also at a parking position of the parking area 7, the plurality of work vehicles 2 sequentially stops. The predetermined position 17 may be a parking position.

Figure 9:
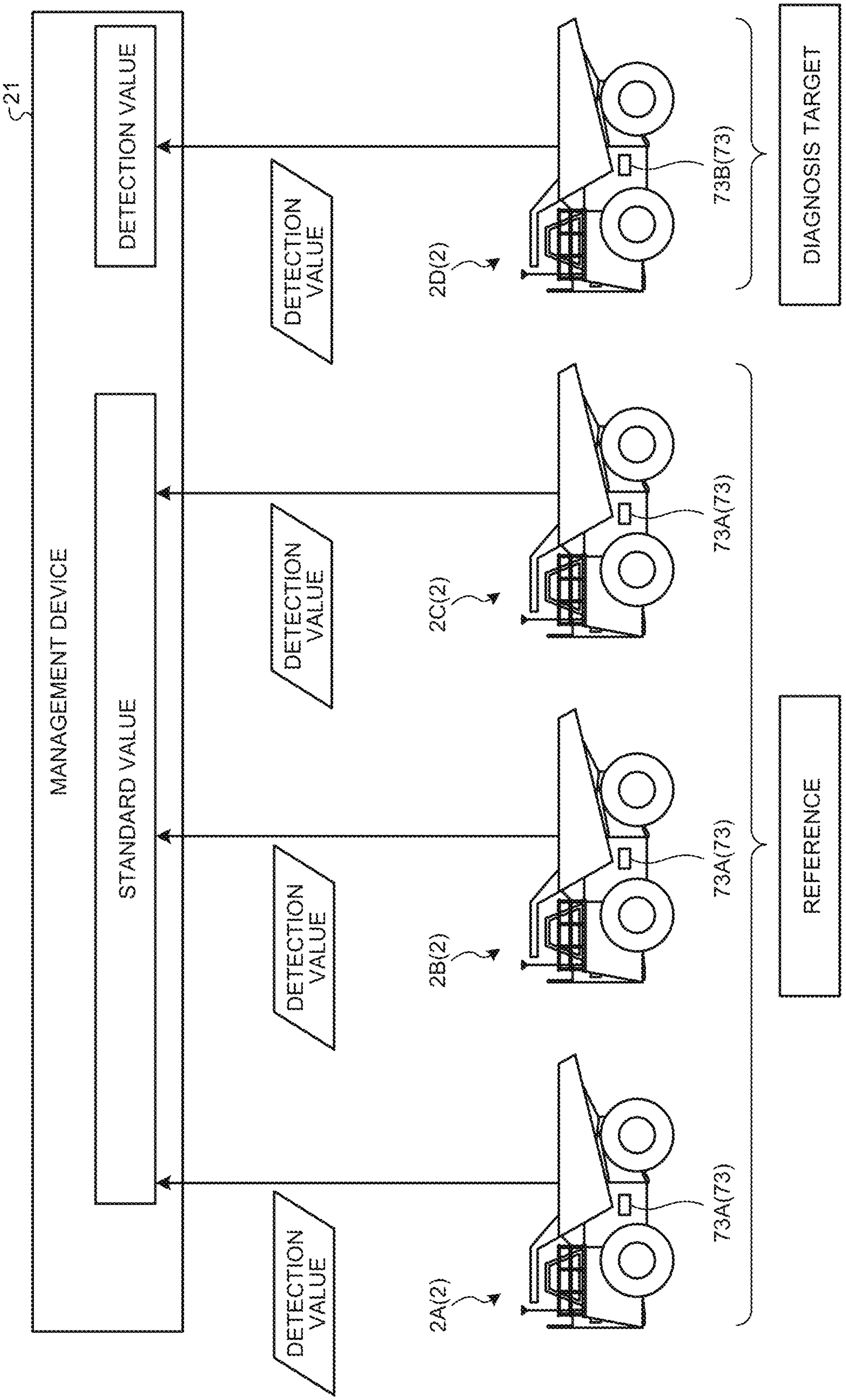
FIG. 9 is a diagram for describing an outline of a method of diagnosing an attitude angle sensor by a management device according to an embodiment.

FIG. 9 is a diagram for describing an outline of a method of diagnosing the attitude angle sensor 73 by the management device 21 according to the embodiment. At the work site 1, a plurality of work vehicles 2 operates. It is assumed that vehicle types of the plurality of work vehicles 2 are the same. That is, the structures and dimensions of the plurality of work vehicles 2 are substantially the same. In addition, it is assumed that the plurality of work vehicles 2 has the same type of attitude angle sensor 73. That is, the structures and performances of the plurality of attitude angle sensors 73 are substantially the same. FIG. 9 illustrates four work vehicles 2 (2A, 2B, 2C, and 2D) as an example.

As described above, at the work site 1, there is the predetermined position 17 where the work vehicle 2 repeatedly stops. The management device 21 acquires the detection value of the attitude angle sensor 73 of the work vehicle 2 each time the work vehicle 2 stops at the predetermined position 17. That is, the management device 21 collects a plurality of detection values of the attitude angle sensor 73 of the work vehicle 2 stopped at the predetermined position 17. In the example illustrated in FIG. 9, the four work vehicles 2 (2A, 2B, 2C, and 2D) sequentially stop at the predetermined position 17. The management device 21 acquires the detection value of the attitude angle sensor 73 of the work vehicle 2 each time the four work vehicles 2 (2A, 2B, 2C, and 2D) sequentially stop at the predetermined position 17.

The management device 21 calculates a standard value related to the detection value of the attitude angle sensor 73 based on the collected plurality of detection values of the attitude angle sensor 73. The standard value indicates a detection value assumed to be output from the normal attitude angle sensor 73. The management device 21 calculates a standard value indicating a likely detection value of the attitude angle sensor 73 based on the collected plurality of detection values of the attitude angle sensor 73.

For example, when the predetermined position 17 is the discharge position 17A, the ground of the discharge position 17A is leveled so as to be parallel to the horizontal plane in many cases. Therefore, the detection value output from the normal attitude angle sensor 73 indicates about 0[°]. Therefore, a likely standard value of the attitude angle sensor 73 is about 0[°].

After calculating the standard value, the management device 21 acquires the detection value of the attitude angle sensor 73, which is a diagnosis target. When the difference between the standard value and the detection value of the attitude angle sensor 73, which is a diagnosis target, is equal to or less than a preset threshold, the management device 21 determines that the attitude angle sensor 73, which is a diagnosis target, is normal. When the difference between the standard value and the detection value of the attitude angle sensor 73, which is a diagnosis target, exceeds the preset threshold, the management device 21 determines that the attitude angle sensor 73, which is a diagnosis target, is abnormal.

In a case where the threshold is set to, for example, 2[°] and the standard value is 0[°], and in a case where the detection value of the attitude angle sensor 73, which is a diagnosis target, is −2[°] or more and +2[°] or less, it is determined that the attitude angle sensor 73, which is a diagnosis target, is normal. A positive value of the detection value of the pitch angle sensor 73P means that the work vehicle 2 is inclined backward with respect to the horizontal plane, and a negative value of the detection value of the pitch angle sensor 73P means that the work vehicle 2 is inclined forward with respect to the horizontal plane. A positive value of the detection value of the roll angle sensor 73R means that the work vehicle 2 is inclined rightward with respect to the horizontal plane, and a negative value of the detection value of the roll angle sensor 73R means that the work vehicle 2 is inclined leftward with respect to the horizontal plane.

In order to calculate the standard value, the management device 21 collects the detection values of the attitude angle sensors 73 from at least two work vehicles 2 among the plurality of work vehicles 2 operating at the work site 1. That is, in the embodiment, the attitude angle sensor 73 included in each of the at least two work vehicles 2 is used as a reference attitude angle sensor 73 for calculating the standard value.

In the description below, the reference attitude angle sensor 73 used to calculate the standard value will be appropriately referred to as a first attitude angle sensor 73A, and the attitude angle sensor 73, which is a diagnosis target, will be appropriately referred to as a second attitude angle sensor 73B.

In the example illustrated in FIG. 9, for example, when the attitude angle sensor 73 included in each of three work vehicles 2A, 2B, and 2C is used as the first attitude angle sensor 73A, each of the work vehicles 2A, 2B, and 2C including the first attitude angle sensor 73A transmits the detection value of the first attitude angle sensor 73A to the management device 21 via the communication system 22. The management device 21 collects the detection value of the first attitude angle sensor 73A from each of the three work vehicles 2A, 2B, and 2C. The management device 21 calculates the standard value related to the detection value of the attitude angle sensor 73 based on the collected three detection values of the three first attitude angle sensors 73A. When the attitude angle sensor 73 included in the work vehicle 2D is the second attitude angle sensor 73B, which is a diagnosis target, the work vehicle 2D including the second attitude angle sensor 73B transmits the detection value of the second attitude angle sensor 73B to the management device 21 via the communication system 22. The management device 21 determines the presence or absence of abnormality of the second attitude angle sensor 73B based on the calculated standard value and the second attitude angle sensor 73B, which is a diagnosis target.

[Management Device]

Figure 10:
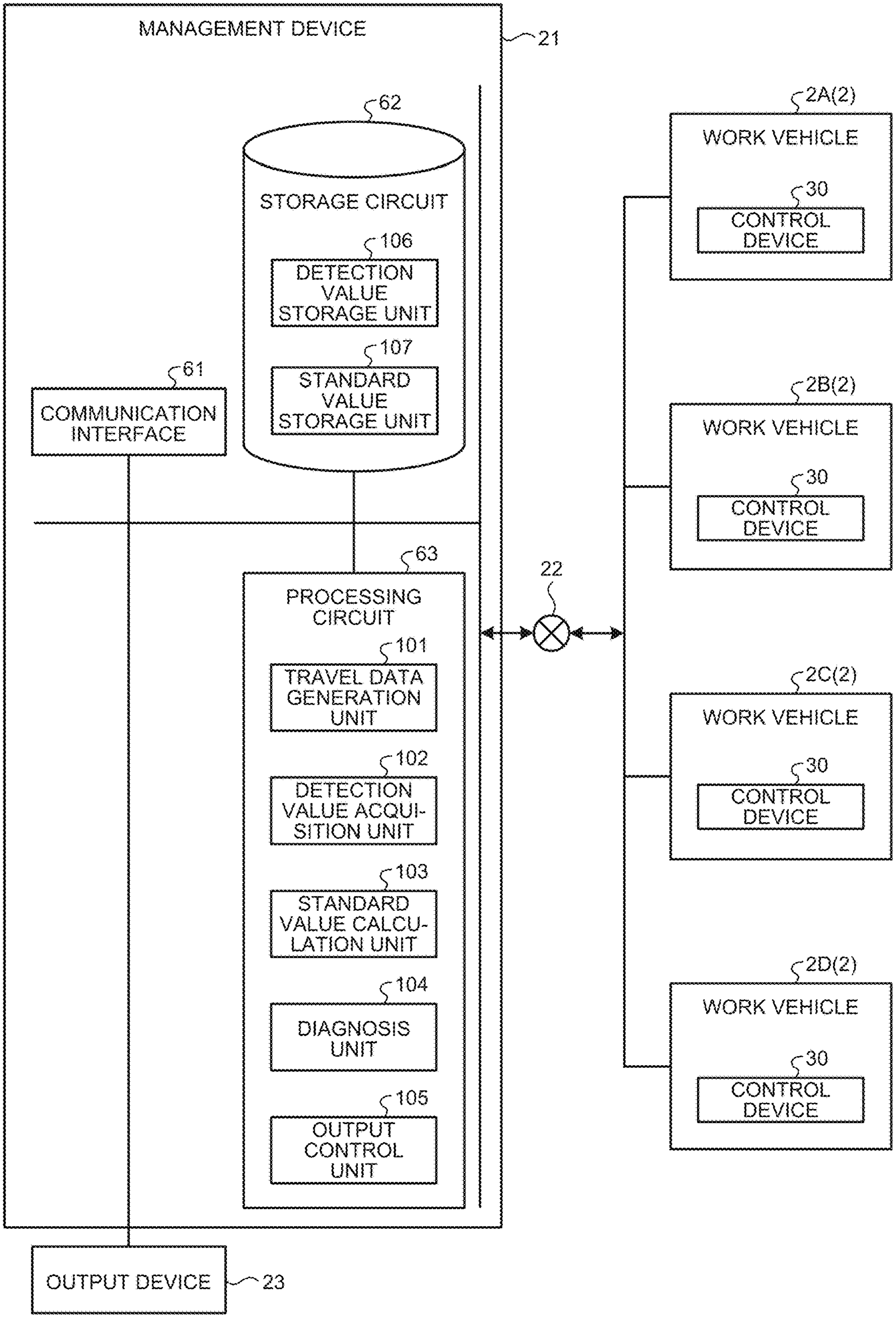
FIG. 10 is a functional block diagram illustrating a management device according to an embodiment.

FIG. 10 is a functional block diagram illustrating the management device 21 according to the embodiment.

As illustrated in FIG. 10, the management device 21 includes a communication interface 61, a storage circuit 62, and a processing circuit 63. An output device 23 is connected to the management device 21. The output device 23 is installed in the control facility 10.

The processing circuit 63 includes a travel data generation unit 101, a detection value acquisition unit 102, a standard value calculation unit 103, a diagnosis unit 104, and an output control unit 105. The storage circuit 62 includes a detection value storage unit 106 and a standard value storage unit 107.

The travel data generation unit 101 generates travel data indicating travel conditions of the work vehicle 2. The travel data generated by the travel data generation unit 101 is transmitted to the work vehicle 2 via the communication system 22.

The detection value acquisition unit 102 acquires a detection value of the attitude angle sensor 73. The work vehicle 2 transmits the detection value of the attitude angle sensor 73 to the management device 21 via the communication system 22 in a state of being stopped at the predetermined position 17. The detection value acquisition unit 102 acquires a detection value of the attitude angle sensor 73 transmitted from the work vehicle 2. The detection value acquisition unit 102 acquires the detection value of the attitude angle sensor 73 each time the work vehicle 2 including the attitude angle sensor 73 stops at the predetermined position 17 of the work site 1. The detection value acquisition unit 102 acquires the detection value of the first attitude angle sensor 73A each time the work vehicle 2 including the first attitude angle sensor 73A, which is a reference attitude angle sensor 73, stops at the predetermined position 17.

As described above, in the embodiment, the plurality of work vehicles 2 (2A, 2B, 2C, and 2D) each including the attitude angle sensor 73 sequentially stops at the predetermined position 17. The plurality of work vehicles 2 (2A, 2B, 2C, and 2D) stopped at the predetermined position 17 is work vehicles 2 different from each other. The detection value acquisition unit 102 acquires the detection value of the first attitude angle sensor 73A each time the plurality of work vehicles 2 each including the first attitude angle sensor 73A and different from each other sequentially stops at the predetermined position 17.

The standard value calculation unit 103 calculates the standard value related to the detection value of the first attitude angle sensor 73A based on the detection value of the first attitude angle sensor 73A when the work vehicle 2 including the first attitude angle sensor 73A stops at the predetermined position 17 of the work site 1. The standard value calculation unit 103 calculates the standard value based on the plurality of detection values of the first attitude angle sensor 73A acquired by the detection value acquisition unit 102. The standard value calculated by the standard value calculation unit 103 is stored in the standard value storage unit 107.

The diagnosis unit 104 determines the presence or absence of abnormality of the second attitude angle sensor 73B based on the standard value calculated by the standard value calculation unit 103 and the detection value of the second attitude angle sensor 73B when the work vehicle 2 including the second attitude angle sensor 73B, which is a diagnosis target, stops at the predetermined position 17.

The detection value acquisition unit 102 acquires the detection value of the second attitude angle sensor 73B at a time point after the time point at which the detection value of the first attitude angle sensor 73A is acquired. The detection value acquisition unit 102 acquires the detection value of the second attitude angle sensor 73B after the standard value is calculated by the standard value calculation unit 103. The diagnosis unit 104 determines the presence or absence of abnormality of the second attitude angle sensor 73B by comparing the standard value stored in the standard value storage unit 107 with the detection value of the second attitude angle sensor 73B, which is a diagnosis target, acquired by the detection value acquisition unit 102.

When the difference between the standard value and the detection value of the second attitude angle sensor 73B, which is a diagnosis target, is equal to or less than a preset threshold, the diagnosis unit 104 determines that the second attitude angle sensor 73B, which is a diagnosis target, is normal. When the difference between the standard value and the detection value of the second attitude angle sensor 73B, which is a diagnosis target, exceeds the preset threshold, the diagnosis unit 104 determines that the second attitude angle sensor 73B, which is a diagnosis target, is abnormal.

The threshold may be set to 2[°], for example. In a case where the standard value is 0[°], and in a case where the detection value of the second attitude angle sensor 73B, which is a diagnosis target, is −2[°] or more and +2[°] or less, it is determined that the second attitude angle sensor 73B, which is a diagnosis target, is normal. When the absolute value of the detection value of the second attitude angle sensor 73B, which is a diagnosis target, exceeds 2[°], it is determined that the second attitude angle sensor 73B, which is a diagnosis target, is abnormal.

The output control unit 105 controls the output device 23. The output device 23 provides output data to a manager present in the control facility 10. Examples of the output device 23 include a display device and a voice output device. The display device displays display data as the output data. The voice output device outputs voice data as the output data. When the diagnosis unit 104 determines that the second attitude angle sensor 73B is abnormal, the output control unit 105 causes the output device 23 to output data indicating that the second attitude angle sensor 73B is abnormal.

The detection value storage unit 106 stores the detection value of the attitude angle sensor 73 acquired by the detection value acquisition unit 102. In the embodiment, the detection value storage unit 106 stores the detection value of the attitude angle sensor 73 determined to be normal, and does not store the detection value of the attitude angle sensor 73 determined to be abnormal.

The standard value storage unit 107 stores the standard value calculated by the standard value calculation unit 103. In the embodiment, the standard value calculation unit 103 calculates the standard value based on the detection value stored in the detection value storage unit 106. That is, the standard value calculation unit 103 calculates the standard value based on the detection value of the attitude angle sensor 73 determined to be normal.

[Initial Value of Standard Value]

Before the initial value of the standard value is calculated, the detection value of the attitude angle sensor 73 is not collected. For example, in a case where the initial value of the standard value is calculated based on the detection values of only the two attitude angle sensors 73, it is assumed that one attitude angle sensor 73 of the two attitude angle sensors 73 is abnormal. Then, it is difficult to calculate a likely standard value from the detection values of the two attitude angle sensors 73. In the calculation of the initial value of the standard value, the detection value acquisition unit 102 collects a plurality of detection values of the first attitude angle sensor 73A. In the case of calculating the initial value of the standard value, the standard value calculation unit 103 selects a plurality of mutually approximate detection values from the plurality of detection values of the first attitude angle sensor 73A acquired by the detection value acquisition unit 102 in order to calculate a likely standard value. The plurality of mutually approximate detection values means that mutual errors of the plurality of detection values are equal to or less than a preset numerical value. The numerical value is stored in the storage circuit 62. The plurality of mutually approximate detection values falls within a predetermined numerical value range. There is a low possibility that the two attitude angle sensors 73 become abnormal at the same time. Therefore, when two mutually approximate detection values are acquired, there is a high possibility that the two attitude angle sensors 73 that output the two detection values are normal. The detection value selected by the standard value calculation unit 103 can be regarded as a detection value output from the normal attitude angle sensor 73. The normal detection value selected by the standard value calculation unit 103 is stored in the detection value storage unit 106.

The standard value calculation unit 103 calculates the standard value based on the detection value stored in the detection value storage unit 106. The standard value calculation unit 103 calculates an average value of the plurality of selected detection values as the standard value. In the embodiment, the standard value is an average value of the plurality of selected detection values. As described above, the plurality of mutually approximate detection values can be regarded as detection values output from the normal attitude angle sensor 73. Since the standard value is an average value of the plurality of mutually approximate detection values, a likely standard value is calculated.

[Update of Standard Value]

The detection value of the attitude angle sensor 73 is acquired by the detection value acquisition unit 102 each time the work vehicle 2 including the attitude angle sensor 73 stops at the predetermined position 17. The detection value storage unit 106 stores the detection value output from the attitude angle sensor 73 determined to be normal among the detection values acquired by the detection value acquisition unit 102. The detection value storage unit 106 stores the detection value in association with a time point at which the detection value output from the normal attitude angle sensor 73 is acquired by the detection value acquisition unit 102. The standard value calculation unit 103 calculates the standard value based on the detection value stored in the detection value storage unit 106. That is, the standard value calculation unit 103 calculates the standard value based on the detection value of the attitude angle sensor 73 determined to be normal.

For example, when it is determined that the attitude angle sensor 73 of the work vehicle 2D illustrated in FIGS. 9 and 10 is normal, the detection value of the attitude angle sensor 73 of the work vehicle 2D is stored in the detection value storage unit 106 and used for calculating the standard value. That is, the second attitude angle sensor 73B determined to be normal functions as the first attitude angle sensor 73A. After the standard value is calculated based on the detection value of the attitude angle sensor 73 of the work vehicle 2D, the attitude angle sensor 73 of a work vehicle 2E stopped at the predetermined position 17 next to the work vehicle 2D is diagnosed. When it is determined that the attitude angle sensor 73 of the work vehicle 2E is normal, the detection value of the attitude angle sensor 73 of the work vehicle 2E is stored in the detection value storage unit 106 and used for calculating the standard value. Thereafter, the above-described processing is repeated.

The detection value storage unit 106 stores the detection value in association with a time point at which the detection value acquisition unit 102 acquires the detection value of the attitude angle sensor 73. The standard value calculation unit 103 calculates the standard value based on the most recent detection value among the plurality of detection values stored in the detection value storage unit 106. For example, the standard value calculation unit 103 calculates the average value of the most recent three detection values determined to be normal as the standard value.

The standard value stored in the standard value storage unit 107 is updated based on the time point when the detection value of the first attitude angle sensor 73A determined to be normal is acquired by the detection value acquisition unit 102. The standard value stored in the standard value storage unit 107 is updated to the latest standard value. The diagnosis unit 104 determines the presence or absence of abnormality of the second attitude angle sensor 73B based on the updated standard value in the standard value storage unit 107 and the detection value of the second attitude angle sensor 73B acquired by the detection value acquisition unit 102.

That is, the standard value calculation unit 103 calculates the standard value based on the latest plurality of detection values of the attitude angle sensor 73 determined to be normal without considering old detection values acquired in the past. For example, in a case where the predetermined position 17 is the discharge position 17A, even when the ground at the discharge position 17A is leveled so as to be parallel to the horizontal plane, there is a possibility that the ground at the discharge position 17A gradually inclines due to the work vehicle 2 repeatedly stopping. By calculating the standard value based on the latest plurality of detection values, the difference between the standard value and the true inclination angle becomes small.

[Management Method]

Figure 11:
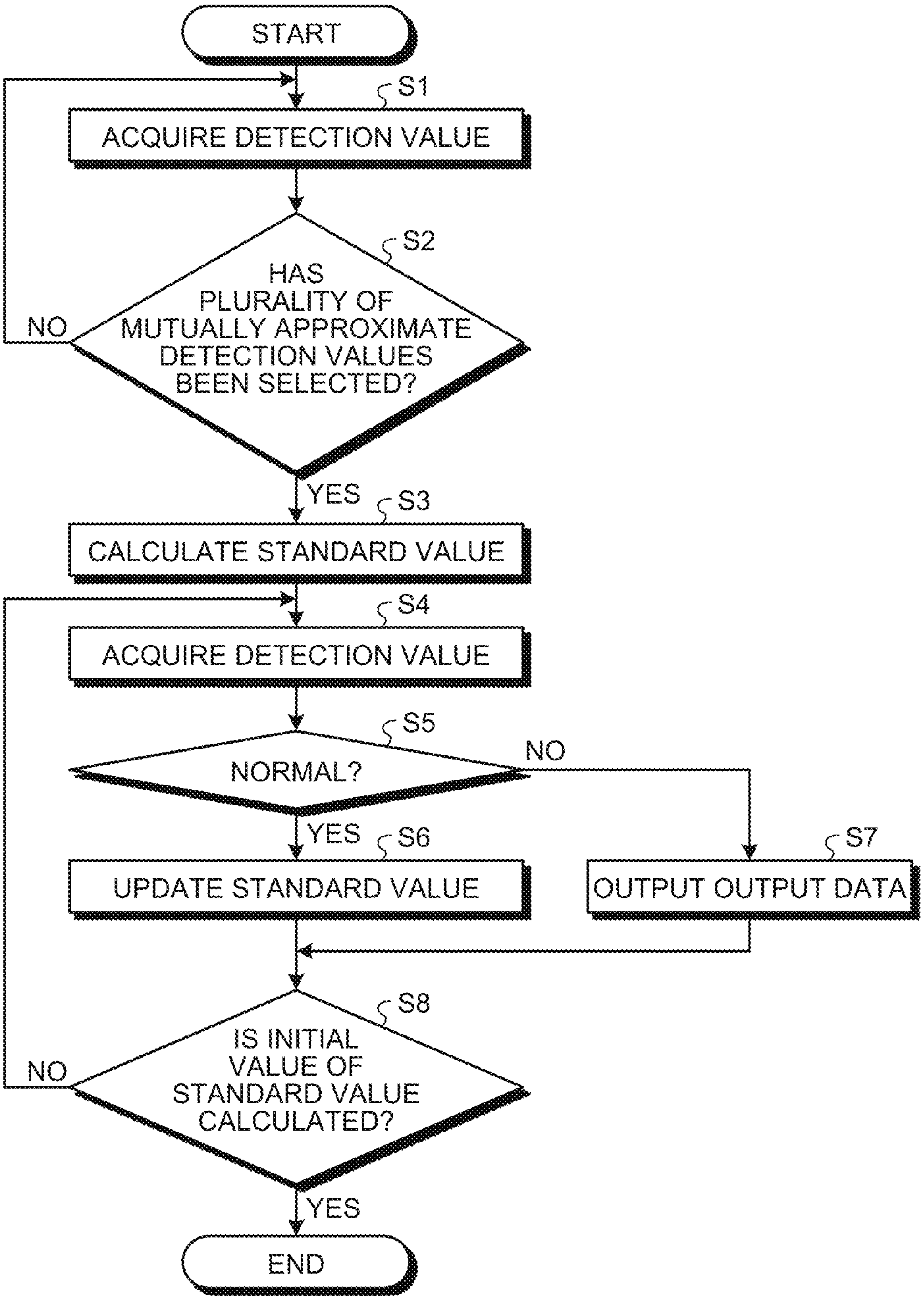
FIG. 11 is a flowchart illustrating a management method for a work vehicle according to an embodiment.

FIG. 11 is a flowchart illustrating a management method for the work vehicle 2 according to the embodiment. When the diagnosis processing of the attitude angle sensor 73 is started, the detection value of the attitude angle sensor 73 is transmitted to the management device 21 from the work vehicle 2 stopped at the predetermined position 17 of the work site 1. The detection value acquisition unit 102 acquires the detection value of the attitude angle sensor 73 when the work vehicle 2 including the attitude angle sensor 73 stops at the predetermined position 17 of the work site 1 (Step S1).

The standard value calculation unit 103 determines whether or not a plurality of mutually approximate detection values has been selected from a plurality of detection values of the attitude angle sensor 73 (Step S2).

When it is determined in Step S2 that a plurality of mutually approximate detection values has not been selected (Step S2: No), the processing returns to Step S1. The processing in Steps S1 and S2 is repeated until it is determined that a plurality of mutually approximate detection values has been selected.

When it is determined in Step S2 that a plurality of mutually approximate detection values has been selected (Step S2: Yes), the standard value calculation unit 103 calculates the standard value related to the detection value of the attitude angle sensor 73 based on the plurality of selected detection values (Step S3).

In the embodiment, the standard value is an average value of the plurality of selected detection values.

The detection value of the attitude angle sensor 73 of the work vehicle 2 is transmitted to the management device 21 each time the work vehicle 2 stops at the predetermined position 17. After the standard value is calculated, the detection value acquisition unit 102 acquires the detection value of the attitude angle sensor 73 when the work vehicle 2 including the attitude angle sensor 73 stops at the predetermined position 17 of the work site 1 (Step S4).

The diagnosis unit 104 determines the presence or absence of abnormality of the attitude angle sensor 73 based on the standard value calculated in Step S3 and the detection value of the attitude angle sensor 73 acquired in Step S4 (Step S5).

Note that after the work vehicle 2 stops at the predetermined position 17, for example, due to vibration of the work vehicle 2, the detection value of the attitude angle sensor 73 may indicate an abnormal value even though the attitude angle sensor 73 is normal. When the detection value of the attitude angle sensor 73 indicates an abnormal value even though the attitude angle sensor 73 is normal, there is a possibility that the attitude angle sensor 73 is erroneously determined to be abnormal. In order to suppress erroneous determination, the detection value of the attitude angle sensor 73 may be acquired a plurality of times after the work vehicle 2 stops at the predetermined position 17, and the diagnosis unit 104 may determine the presence or absence of abnormality of the attitude angle sensor 73 based on the detection value of the attitude angle sensor 73 acquired a plurality of times.

When it is determined in Step S5 that the attitude angle sensor 73 is normal (Step S5: Yes), the standard value calculation unit 103 recalculates the standard value using the detection value of the normal attitude angle sensor 73 acquired in Step S4. That is, the standard value is updated (Step S6).

When it is determined in Step S5 that the attitude angle sensor 73 is abnormal (Step S5: No), the output control unit 105 causes the output device 23 to output data indicating that the attitude angle sensor 73 is abnormal (Step S7).

In a case where the output device 23 is a display device, display data indicating that the attitude angle sensor 73 is abnormal is displayed on the display device. In a case where the output device 23 is a voice output device, voice data indicating that the attitude angle sensor 73 is abnormal is output from the voice output device. The manager of the control facility 10 can maintain the attitude angle sensor 73 determined to be abnormal based on the output data. Maintenance of the attitude angle sensor 73 includes at least one of inspection, repair, and replacement of the attitude angle sensor 73.

After the standard value is updated in Step S6 or after the output data is output in Step S7, the standard value calculation unit 103 determines whether or not to calculate an initial value of the standard value (Step S8). When the situation of the predetermined position 17 changes, the standard value calculation unit 103 determines to calculate the initial value of the standard value. As described above, the predetermined position 17 includes at least one of the discharge position 17A and the switchback position 17B. For example, when the ground leveling work at the predetermined position 17 is performed or when the predetermined position 17 is changed, the standard value calculation unit 103 determines to calculate the initial value of the standard value.

When it is determined in Step S8 that the initial value of the standard value is calculated (Step S8: Yes), the diagnosis processing ends.

When it is determined in Step S8 that the initial value of the standard value is not calculated (Step S8: No), the processing returns to Step S4. The processing from Step S4 to Step S8 is repeated until it is determined that the initial value of the standard value is calculated.

[Effects]

As described above, in the embodiment, the standard value related to the detection value of the attitude angle sensor 73 is calculated based on the detection value of the attitude angle sensor 73 when the work vehicle 2 including the attitude angle sensor 73 stops at the predetermined position 17 of the work site 1. Since the detection value of the reference attitude angle sensor 73 is collected when the work vehicle 2 stops, acquisition of a varying detection value is suppressed. Accordingly, the standard value related to the detection value of the attitude angle sensor 73 is appropriately calculated. After the standard value related to the detection value of the attitude angle sensor 73 is calculated, the detection value of the attitude angle sensor 73 when the work vehicle 2 including the attitude angle sensor 73, which is a diagnosis target, stops at the predetermined position 17 is acquired. The diagnosis unit 104 can appropriately determine the presence or absence of abnormality of the attitude angle sensor 73, which is a diagnosis target, by comparing the standard value related to the detection value of the attitude angle sensor 73 with the detection value of the attitude angle sensor 73, which is a diagnosis target.

The detection value of the attitude angle sensor 73 is acquired each time the work vehicle 2 stops at the predetermined position 17. The standard value related to the detection value of the attitude angle sensor 73 is appropriately calculated based on the plurality of detection values of the attitude angle sensor 73 acquired each time the work vehicle 2 stops at the predetermined position 17.

In the case of calculating the initial value of the standard value, for example, in a case where the initial value of the standard value is calculated based on the detection values of only the two attitude angle sensors 73, it is assumed that one attitude angle sensor 73 of the two attitude angle sensors 73 is abnormal. Then, it is difficult to calculate a likely standard value from the detection values of the two attitude angle sensors 73. A plurality of mutually approximate detection values is selected from a plurality of detection values collected from the reference attitude angle sensor 73 such that an initial value of a likely standard value is calculated. The selected detection value can be regarded as a detection value output from the normal attitude angle sensor 73. Therefore, an appropriate standard value is calculated based on the plurality of selected detection values.

The standard value is updated based on the time point when the detection value of the attitude angle sensor 73 is acquired. That is, the standard value is calculated based on the latest plurality of detection values of the attitude angle sensor 73 determined to be normal without considering old detection values acquired in the past. As a result, even when the situation of the predetermined position 17 changes, the standard value is appropriately calculated based on the latest plurality of detection values. Therefore, the presence or absence of the abnormality of the attitude angle sensor 73, which is a diagnosis target, is appropriately determined based on the updated standard value.

OTHER EMBODIMENTS

In the above-described embodiment, the work vehicle 2 including the reference first attitude angle sensor 73A and the work vehicle 2 including the second attitude angle sensor 73B, which is a diagnosis target, are different work vehicles 2. The work vehicle 2 including the reference first attitude angle sensor 73A and the work vehicle 2 including the second attitude angle sensor 73B, which is a diagnosis target, may be the same work vehicle 2.

Figure 12:
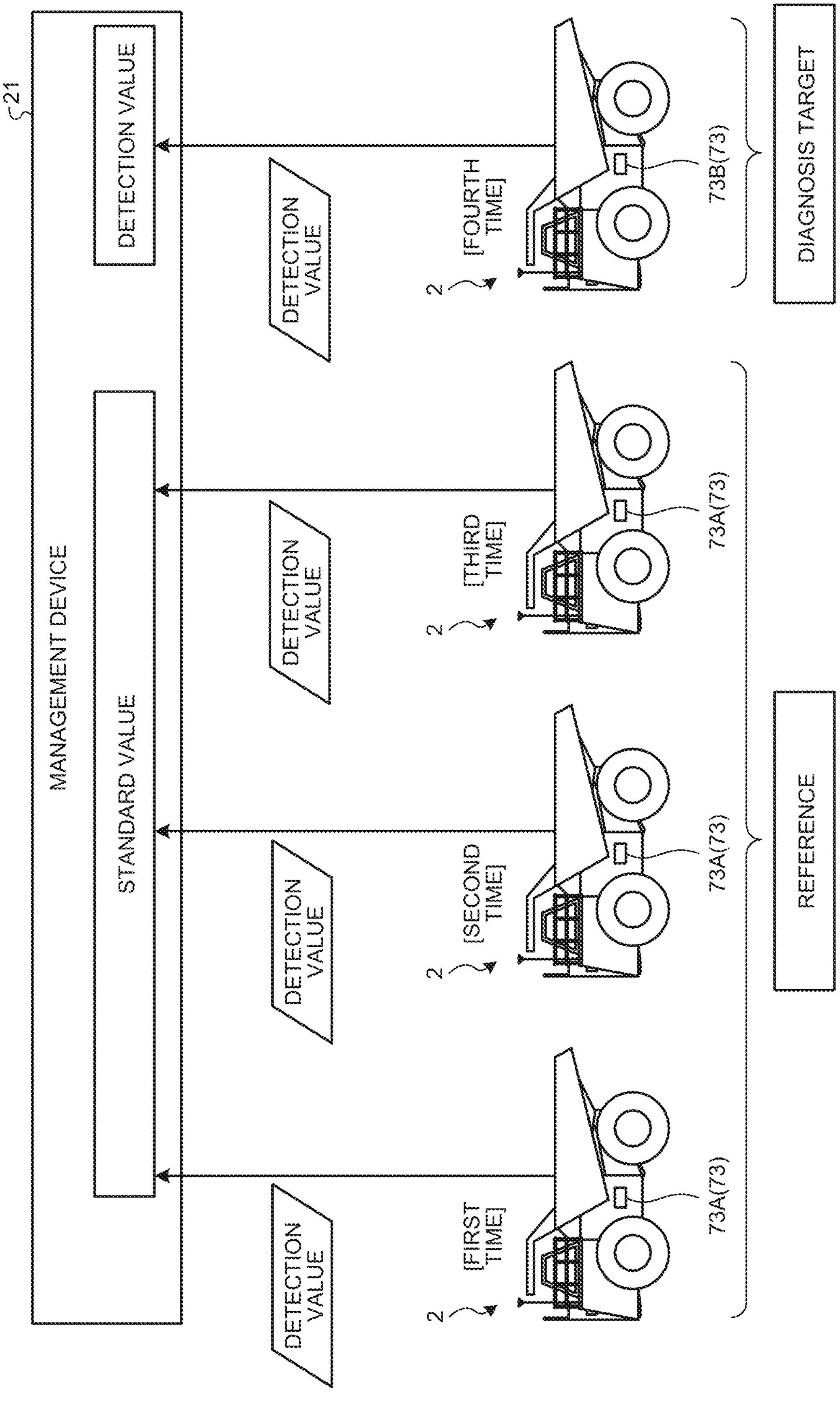
FIG. 12 is a diagram for describing an outline of a method of diagnosing an attitude angle sensor by a management device according to an embodiment.

FIG. 12 is a diagram for describing an outline of a method of diagnosing the attitude angle sensor 73 by the management device 21 according to the embodiment. The same work vehicle 2 may repeatedly stop at the predetermined position 17. FIG. 12 illustrates an example in which the same work vehicle 2 stops at the predetermined position 17 four times. The detection value acquisition unit 102 acquires the detection value of the attitude angle sensor 73 of the work vehicle 2 each time the work vehicle 2 stops at the predetermined position 17.

The standard value calculation unit 103 calculates the standard value related to the detection value of the attitude angle sensor 73 based on the plurality of detection values of the attitude angle sensor 73 acquired by the detection value acquisition unit 102.

For example, the attitude angle sensor 73 the detection value of which is acquired at each of the first stop time, the second stop time, and the third stop time is used as the reference first attitude angle sensor 73A for calculating the standard value. The attitude angle sensor 73 the detection value of which is acquired at the fourth stop time is the second attitude angle sensor 73B, which is a diagnosis target. The standard value calculation unit 103 calculates the standard value based on the detection values of the attitude angle sensor acquired at each of the first stop time, the second stop time, and the third stop time. The diagnosis unit 104 determines the presence or absence of abnormality of the attitude angle sensor 73 based on the standard value calculated by the standard value calculation unit 103 and the detection value of the attitude angle sensor 73 when the work vehicle 2 stops at the predetermined position 17 for the fourth time.

The work vehicle 2 including the reference first attitude angle sensor 73A and the work vehicle 2 including the second attitude angle sensor 73B, which is a diagnosis target, are the same work vehicle 2, and the presence or absence of abnormality of the second attitude angle sensor 73B is determined with high accuracy.

In the above-described embodiment, the detection value acquisition unit 102 acquires the detection value of the first attitude angle sensor 73A each time the work vehicle 2 including the first attitude angle sensor 73A stops at the predetermined position 17, and the standard value calculation unit 103 calculates the standard value based on the plurality of detection values of the first attitude angle sensor 73A acquired by the detection value acquisition unit 102. The detection value acquisition unit 102 may not acquire the plurality of detection values of the first attitude angle sensor 73A. For example, when the reference work vehicle 2 stops at the predetermined position 17, the detection value of the first attitude angle sensor 73A may be acquired only once by the detection value acquisition unit 102, and the one detection value of the first attitude angle sensor 73A acquired by the detection value acquisition unit 102 may be regarded as the standard value.

In the above-described embodiment, at least some of the functions of the management device 21 may be provided in the control device 30 of the work vehicle 2. That is, some or all of the travel data generation unit 101, the detection value acquisition unit 102, the standard value calculation unit 103, the diagnosis unit 104, the detection value storage unit 106, and the standard value storage unit 107 may be provided in the control device 30 of the work vehicle 2. For example, as described with reference to FIG. 12, when the work vehicle 2 including the reference first attitude angle sensor 73A and the work vehicle 2 including the second attitude angle sensor 73B, which is a diagnosis target, are the same work vehicle 2, all of the detection value acquisition unit 102, the standard value calculation unit 103, the diagnosis unit 104, the detection value storage unit 106, and the standard value storage unit 107 may be provided in the control device 30 of the work vehicle 2.

In the above-described embodiment, at least some of the functions of the control device 30 may be provided in the management device 21.

In the above-described embodiment, each of the travel data generation unit 101, the detection value acquisition unit 102, the standard value calculation unit 103, the diagnosis unit 104, the detection value storage unit 106, and the standard value storage unit 107 may be configured by separate hardware.

In the above-described embodiment, the work vehicle 2 is an unmanned vehicle. The work vehicle 2 may be a manned vehicle. The manned vehicle refers to a work vehicle that operates by a driving manipulation of a driver who gets on the cab of the work vehicle 2.

In the above-described embodiment, the attitude angle sensor 73 may be an inertial measurement unit (IMU).

In the above-described embodiment, the work vehicle 2 may be a mechanically driven dump truck or an electrically driven dump truck.

In the above-described embodiment, the work vehicle 2 is a haul vehicle. The work vehicle 2 may not be a haul vehicle, but may be a work vehicle having a working equipment. Examples of the work vehicle having a working equipment include a wheel loader, an excavator, and a bulldozer.

REFERENCE SIGNS LIST

1 WORK SITE
2 WORK VEHICLE
2A WORK VEHICLE
2B WORK VEHICLE
2C WORK VEHICLE
2D WORK VEHICLE
4 TRAVEL AREA
5 LOADING AREA
6 DISCHARGING AREA
7 PARKING AREA
8 FUEL SUPPLY AREA
9 TRAVELING PATH
9A APPROACH PATH
9B EXIT PATH
10 CONTROL FACILITY
11 LOADER
12 CRUSHER
13 TRAVEL POINT
14 TRAVEL PATH
15 DISTAL END PORTION
16 SPECIFIC PORTION
16A POSITION
16B POSITION
16C POSITION
16D POSITION
17 PREDETERMINED POSITION
17A DISCHARGE POSITION
17B SWITCHBACK POSITION
20 MANAGEMENT SYSTEM
21 MANAGEMENT DEVICE
22 COMMUNICATION SYSTEM
22A WIRELESS COMMUNICATOR
22B WIRELESS COMMUNICATOR
23 OUTPUT DEVICE
30 CONTROL DEVICE
31 COMMUNICATION INTERFACE
32 STORAGE CIRCUIT
33 PROCESSING CIRCUIT
34 TRAVEL DATA ACQUISITION UNIT
35 DETECTION VALUE ACQUISITION UNIT
36 DETECTION VALUE TRANSMISSION UNIT
37 POSITION CALCULATION UNIT
38 TRAVEL CONTROL UNIT
50 VEHICLE BODY
51 TRAVEL DEVICE
52 DUMP BODY
53 WHEEL
53F FRONT WHEEL
53R REAR WHEEL
54 TIRE
54B LOWER END PORTION
54F FRONT TIRE
54R REAR TIRE
55 DRIVE DEVICE
56 BRAKE DEVICE
57 TRANSMISSION DEVICE
58 STEERING DEVICE
59 AXLE
61 COMMUNICATION INTERFACE
62 STORAGE CIRCUIT
63 PROCESSING CIRCUIT
71 POSITION SENSOR
72 ORIENTATION SENSOR
73 ATTITUDE ANGLE SENSOR
73A FIRST ATTITUDE ANGLE SENSOR
73B SECOND ATTITUDE ANGLE SENSOR
73P PITCH ANGLE SENSOR
73R ROLL ANGLE SENSOR
74 SPEED SENSOR
75 GNSS ANTENNA
101 TRAVEL DATA GENERATION UNIT
102 DETECTION VALUE ACQUISITION UNIT
103 STANDARD VALUE CALCULATION UNIT
104 DIAGNOSIS UNIT
105 OUTPUT CONTROL UNIT
106 DETECTION VALUE STORAGE UNIT
107 STANDARD VALUE STORAGE UNIT
PA PITCH AXIS
RA ROLL AXIS
YA YAW AXIS

The invention claimed is:

1. A management system for a work vehicle, comprising a processor,
the processor being configured to:
calculate a standard value related to a detection value based on the detection value of a first attitude angle sensor when a work vehicle including the first attitude angle sensor stops at a predetermined position of a work site;
determine presence or absence of abnormality of a second attitude angle sensor based on the standard value calculated and a detection value of the second attitude angle sensor when a work vehicle including the second attitude angle sensor stops at the predetermined position;
acquire the detection value of the first attitude angle sensor each time the work vehicle including the first attitude angle sensor stops at the predetermined position;
calculate the standard value based on a plurality of detection values determined to be normal among the plurality of detection values of the first attitude angle sensor acquired; and
control the work vehicle to travel in the worksite based at least in part on detection data obtained by the first and second attitude angle sensors.

2. The management system for a work vehicle according to claim 1, wherein the processor is configured to select a plurality of mutually approximate detection values from the plurality of detection values determined to be normal among the plurality of detection values of the first attitude angle sensor acquired, the standard value is an average value of the plurality of selected detection values, and wherein the plurality of mutually approximate detection values are defined as mutual errors of the plurality of detection values equal to or less than a preset numerical value.

3. The management system for a work vehicle according to claim 1, wherein the processor is configured to:

store a detection value of the first attitude angle sensor determined to be normal, store the standard value, and calculate the standard value based on the detection value stored, wherein the standard value stored is updated based on a time point when the detection value of the first attitude angle sensor determined to be normal is acquired, and wherein the processor is further configured to determine presence or absence of the abnormality based on the updated standard value and the detection value of the second attitude angle sensor acquired.

4. The management system for a work vehicle according to claim 1, wherein the processor is configured to acquire the detection value of the first attitude angle sensor each time a plurality of mutually different work vehicles each including the first attitude angle sensor sequentially stops at the predetermined position.

5. The management system for a work vehicle according to claim 1, wherein the work vehicle including the first attitude angle sensor and the work vehicle including the second attitude angle sensor are different work vehicles.

6. The management system for a work vehicle according to claim 5, comprising:

a management device that is disposed outside the work vehicle, wherein the detection value of the first attitude angle sensor is transmitted from the work vehicle including the first attitude angle sensor to the management device, and the detection value of the second attitude angle sensor is transmitted from the work vehicle including the second attitude angle sensor to the management device.

7. The management system for a work vehicle according to claim 1, wherein the work vehicle including the first attitude angle sensor and the work vehicle including the second attitude angle sensor are a same work vehicle.

8. The management system for a work vehicle according to claim 1, wherein the work vehicle is a haul vehicle that hauls a load, and the predetermined position includes a discharge position where the load is discharged from the haul vehicle to a crusher.

9. A management method for a work vehicle, comprising:

calculating a standard value related to a detection value based on the detection value of a first attitude angle sensor when a work vehicle including the first attitude angle sensor stops at a predetermined position of a work site; and determining presence or absence of abnormality of a second attitude angle sensor based on the standard value and a detection value of the second attitude angle sensor when a work vehicle including the second attitude angle sensor stops at the predetermined position, wherein the standard value is calculated based on a plurality of detection values determined to be normal among the plurality of detection values of the first attitude angle sensor acquired each time the work vehicle including the first attitude angle sensor stops at the predetermined position; and controlling the work vehicle to travel in the worksite based at least in part on detection data obtained by the first and second attitude angle sensors.

10. The management method for a work vehicle according to claim 9, comprising:

selecting a plurality of mutually approximate detection values from the plurality of detection values determined to be normal among the plurality of detection values of the first attitude angle sensor, wherein the standard value is an average value of the plurality of selected detection values, and wherein the plurality of mutually approximate detection values are defined as mutual errors of the plurality of detection values equal to or less than a preset numerical value.

11. The management method for a work vehicle according to claim 9, wherein the standard value is calculated based on a detection value of the first attitude angle sensor determined to be normal, the standard value is updated based on a time point when the detection value of the first attitude angle sensor determined to be normal is acquired, and the presence or absence of the abnormality is determined based on the updated standard value and the detection value of the second attitude angle sensor acquired at a time point after the time point when the detection value of the first attitude angle sensor is acquired.

12. The management method for a work vehicle according to claim 9, wherein the standard value is calculated based on the detection value of the first attitude angle sensor acquired each time a plurality of mutually different work vehicles each including the first attitude angle sensor sequentially stops at the predetermined position.

13. The management method for a work vehicle according to claim 9, wherein the work vehicle including the first attitude angle sensor and the work vehicle including the second attitude angle sensor are different work vehicles.

14. The management method for a work vehicle according to claim 13, wherein a management device that calculates the standard value and determines presence or absence of the abnormality is disposed outside the work vehicle, and the management method comprises:

transmitting the detection value of the first attitude angle sensor to the management device; and transmitting the detection value of the second attitude angle sensor to the management device.

15. The management method for a work vehicle according to claim 9, wherein the work vehicle including the first attitude angle sensor and the work vehicle including the second attitude angle sensor are a same work vehicle.

16. The management method for a work vehicle according to claim 9, wherein the work vehicle is a haul vehicle that hauls a load, and the predetermined position includes a discharge point at which the load is discharged from the haul vehicle.

17. A work vehicle comprising:

a vehicle body;

a travel device;

an attitude angle sensor that is disposed in the vehicle body; and a processor, the processor being configured to:

calculate a standard value related to a detection value based on the detection value of the attitude angle sensor when the travel device stops at a predetermined position of a work site; and determine presence or absence of abnormality of the attitude angle sensor based on the standard value calculated and the detection value of the attitude angle sensor when the travel device stops at the predetermined position after the standard value is calculated;

calculate the standard value based on a plurality of detection values determined to be normal among the plurality of detection values of the attitude angle sensor acquired each time the travel device stops at the predetermined position; and control the work vehicle to travel in the worksite based at least in part on detection data obtained by the first and second attitude angle sensors.

* * * * *